United States Patent [19]

Neder et al.

[11] Patent Number: 4,643,594
[45] Date of Patent: Feb. 17, 1987

[54] SEALED ROLLING BEARING

[75] Inventors: Günter Neder, Schweinfurt; Rainer Schürger, Schwanfeld; Horst M. Ernst, Eltingshausen, all of Fed. Rep. of Germany

[73] Assignee: SKF GmbH, Schweinfurt, Fed. Rep. of Germany

[21] Appl. No.: 808,931

[22] Filed: Dec. 13, 1985

[30] Foreign Application Priority Data

Dec. 19, 1984 [DE] Fed. Rep. of Germany .... 8437101.3

[51] Int. Cl.⁴ .............................................. F16C 33/78
[52] U.S. Cl. .................................... 384/478; 384/482; 384/488; 277/95
[58] Field of Search ............... 384/478, 482, 135, 134, 384/486, 484, 488; 277/95

[56] References Cited

U.S. PATENT DOCUMENTS 2,689,771  9/1954  Annen ................................. 384/478
3,642,335  2/1972  Takahashi et al. .................. 384/482

Primary Examiner—Lenard A. Footland
Attorney, Agent, or Firm—Rosen, Dainow & Jacobs

[57] ABSTRACT

A sealed rolling bearing in which the seal consists of a sealing lip and a sealing projection connected to a sealing body. When the sealing body is seated in a groove formed in the outer ring, the sealing lip abuts a side surface of a groove formed in the inner ring with prestress. The sealing lip and sealing projection abut under the influence of the prestress to form a conical, outwardly directed centrifugal surface for ejecting moisture and dirt through a gap seal formed between the sealing projection and a shoulder of the bearing inner ring.

4 Claims, 1 Drawing Figure

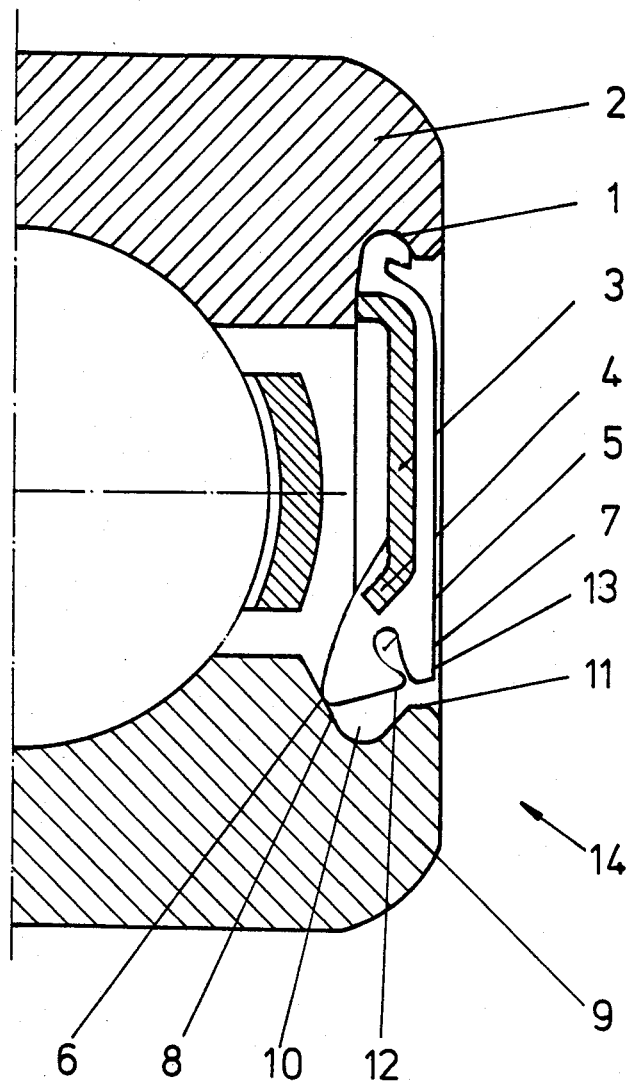

SEALED ROLLING BEARING

FIELD OF THE INVENTION

This invention relates to a sealed rolling bearing having a reinforced sealing body forming a contact seal and a gap seal.

BACKGROUND OF THE INVENTION

A rolling bearing of the foregoing type is derivable from the drawings of U.S. Pat. No. 3,642,335. These drawings show a seal with two sealing zones, namely an axially inner contact seal and an outer gap seal. Between the two sealing zones the seal is provided with a radially inwardly opening annular space. The seal is reinforced by a sheet metal washer extending nearly to the annular space. The sealing lip and the sealing projection are made of elastic material and are securely connected with the inner periphery of the sheet metal washer. In the illustrated embodiment the sealing lip and the sealing projection are movable independently of one another. For this reason the seal can be easily axially ejected from the form after molding. A tool portion which forms the annular space is therefore axially removable from the form since the sealing portion yields axially as a result of its own elasticity. The annular space itself, however, has a relatively large and wide back taper, so that as a result of the centrifugal force produced during rotation of the rolling bearing in use, moisture enters the annular space by penetrating the outer sealing gap. In the event of operation in the presence of spray water, the danger exists that the sealing action of the sealing lip of this known rolling bearing will no longer suffice and that moisture and dirt will penetrate into the bearing space.

SUMMARY OF THE INVENTION

The object of the invention is to provide a sealed rolling bearing of the above-described type in which the sealing action is sufficient also with adverse conditions under the action of spray water, thereby securing the bearing space against the admission of moisture or foreign bodies.

This object is achieved in a manner such that when the seal is installed, at least the radially inner portion of the sealing lip nearly abuts the sealing projection and the inner rim of the sealing lip together with the inner rim of the sealing projection form a substantially conical, outwardly directed annular surface.

By means of this arrangement an accumulation of moisture in the area of the seal due to the action of spray water is prevented. The conical, outwardly directed annular surface forms a centrifugal surface, which induces all of the moisture from the affected area radially and axially outwardly during rotation of the rolling bearing. As a result of this suction action, foreign bodies such as dirt and the like are advantageously removed from the groove formed in the inner ring. The axially outer gap seal thereby acts as a nozzle which further accelerates the particles of moisture and dirt and thus assists in the desired evacuation function. Easy removal from the mold, e.g. after injection molding in a corresponding form, need not be sacrificed since a sufficient flexibility of the sealing lip as well as the sealing projection without opposing influences through the annular space arranged therebetween is ensured in accordance with the seal of the invention. This advantage is significant particularly in the case of seals for relatively small bearings, wherein the dimensions of the sealing lip and the sealing projection are very small. The annular space in this case directly produces a sufficiently high flexibility of the sealing lip for biasing of the lip against the side surface of the groove, whereby an influx at the gap seal is excluded. In this way the sealing projection remains unaffected in its required position for forming the gap seal also under adverse circumstances. The sealing projection is likewise flexibly connected to the rest of the sealing body in order that it can yield during axial removal of the tool forming the annular space. Upon installation of the seal, the sealing lip abuts the sealing projection as a result of the axial dislocation needed for prestressing, so that the annular space is closed. For this reason nothing can penetrate the annular space. The configuration and disposition of the inner partial annular surfaces of the sealing lip and the sealing projection are designed such that the desired, nearly continuous, conical, outwardly directed annular surface is produced.

In accordance with a further feature of the invention, the sealing lip and sealing projection, when the seal is installed, are separated by a slot with mutually opposing side surfaces. In this way increased security against the admission of moisture and dirt is produced, being practically nonexistent in the embodiment disclosed.

BRIEF DESCRIPTION OF THE DRAWING

The preferred embodiment of the invention will be described in detail with reference to the drawing, which shows a partial longitudinal section of a sealed ball bearing.

DETAILED DESCRIPTION OF THE PREFERRED EMBODIMENT

As shown in the figure, the seal is installed in a groove 1 formed in the outer ring 2 and is reinforced by a sheet metal washer 3. The inner rim 4 of the sheet metal washer 3 is bent toward the inner space of the bearing and extends nearly to an annular space 5 which separates a sealing lip 6 from a sealing projection 7. The sealing lip 6 forms a contact seal with the axially inner side surface 8 of a groove 10 incorporated in the area of the shoulder of the inner ring 9. The sealing projection 7 cooperates with the outer, somewhat lower diameter shoulder surface 11 of the inner ring 9 and forms therewith a gap seal. The sealing lip 6 under axial prestress abuts the side surface 8 of the groove 10 and is deflected axially outwardly for this reason and because of its own flexible connection to the remainder of the seal body. At the same time the corresponding axial outer rim area 12 of the sealing lip 6, i.e. in the transitional zone of the annular space 5, abuts the opposing rim 13 of the sealing projection 7. The annular space 5 is in this way closed, thereby forming a nearly continuous, conical, outwardly directed annular surface 14, comprised of partial surfaces of the sealing lip 6 and the sealing projection 7. The sealing projection 7, which can be flexed relative to the rest of the sealing body, is, however, rigidly positioned when the seal is in its installed state.

What is claimed is:

1. In a sealed rolling bearing comprised of an outer ring having a raceway and an annular groove, an inner ring having a raceway and an annular groove, a row of rolling bodies arrange in said raceways, and a seal seated in said annular groove of said outer ring, said seal being comprised of a sealing lip and a sealing projection connected to a sealing body, said annular groove of said inner ring being arranged in the area of a shoulder of said inner ring that has an axially inner side surface which said sealing lip abuts with prestress, said inner ring having a circumferential surface axially outwardly of said shoulder which forms a gap seal with said sealing projection, said seal defining an annular space between said sealing lip and sealing projection, the improvement wherein a radially inner portion of said sealing lip abuts said sealing projection radially inwardly of said annular space, and the inner periphery of said sealing lip together with the inner periphery of said sealing projection define aligned, conical, outwardly directed annular surfaces.

2. The sealed rolling bearing of claim 1 wherein said sealing lip axially abuts said sealing projection, to radially close said annular space.

3. In a sealed rolling bearing comprised of an outer ring having a raceway and an annular groove, an inner ring having a raceway and an annular groove, a row of rolling bodies arranged in said raceways, and a seal seated in said annular groove of said outer ring, said seal being comprised of a sealing lip and a sealing projection connected to a sealing body, said annular groove of said inner ring being arranged in the area of a shoulder of said inner ring that has an axially inner side surface which said sealing lip abuts with prestress, said inner ring having a circumferential surface axially outwardly of said shoulder which forms a gap seal with said sealing projection, the improvement wherein the sealing lip and sealing projection are separated by a slot with mutually opposed side surfaces and the inner periphery of said sealing lip together with the inner periphery of said sealing projection define aligned, conical, outwardly directed annular surfaces radially inwardly of said slot.

4. The sealed rolling bearing of claim 3 wherein said sealing lip axially abuts said sealing projection, to close the radially inner end of said slot.

* * * * *